UNITED STATES PATENT OFFICE.

SAMUEL H. TURNER, OF BROOKLYN, NEW YORK.

IMPROVEMENT IN PRINTER'S INK.

Specification forming part of Letters Patent No. 10,006, dated September 6, 1853.

*To all whom it may concern:*

Be it known that I, SAML. H. TURNER, of Brooklyn, in the county of Kings and State of New York, have invented a new and useful Improvement in the Manufacture of Printing-Ink and Varnish, of which the following is a full, clear, and exact description.

My improvement consists in the employment of colophonic tar, in connection with other ingredients, in the manufacture of printing-ink, and also in the employment of this material (colophonic tar) as a printing-ink varnish. What I denominate "colophonic tar" is the tarry residuum remaining in stills, or what is called the "cucurbit," after the various stages of distillation commonly employed in obtaining colophonic oil.

In the manufacture of colophonic oil it is usual to subject colophony to three successive distillations, in which it is thoroughly decomposed, and its elements to a very great degree separated. After the completion of each separate distillation a tarry residuum always remains in the still, which, after being partially cooled, is drawn out. The second residuum I have usually found to be best adapted for making printing-ink. The long and intense heat to which it is subjected (being in a close vessel some six hours, more or less, with a heat varying from 500° to 700°) completely prepares it for the purpose and dispels from it the injurious properties, which are separated and passed off with the oily vapors.

Colophonic tar, as I prepare it, is unlike all the oily preparations for printing-ink, in that it may be used without the admixture of rosin, and is of itself an excellent printing-ink varnish.

Printing-ink may be prepared with the following ingredients in the following proportions, viz: colophonic tar, fourteen pounds; fine lamp-black, three pounds; fine pulverized indigo-blue, eight ounces; fine pulverized Indian red, four ounces; yellow rosin soap, one pound. I cut the soap in thin slices and dissolve it in the colophonic tar by the aid of heat. I then allow the mixture to cool down to a temperature of about 100°. The pigments are then carefully stirred in, so as to produce a perfect incorporation of all the ingredients. This mixture is next ground in Bogardus' patent eccentric mill, or otherwise, after which the ink may be put up for use.

In the manufacture of printing-ink it will doubtless be found expedient to incorporate ingredients not herein named, as well as to vary those that are enumerated, according to the color and quality of the ink desired, which will be regulated agreeable to the judgment and skill of the artificer. I also use this material (the colophonic tar) as a varnish to modify the condition of printing-ink to suit the temperature of the weather and the kind of work to be executed.

What I claim as my invention, and desire to secure by Letters Patent, is—

The employment of colophonic tar, produced and combined substantially as herein stated, both in the manufacture of printing-ink and also as a varnish used by printers to modify the condition of their ink to suit the temperature of the weather and the kind of work to be executed, all as herein specified.

SAMUEL H. TURNER.

Witnesses:
I. BIGELOW,
J. BROOKS.